S. F. Dimock,
Cage Trap,
N° 59,980. Patented Nov. 27 1866.

Witnesses;
J. H. Burridge
E. E. Waite

Inventor;
S. F. Dimock

United States Patent Office.

IMPROVEMENT IN ANIMAL TRAPS.

S. F. DIMOCK, OF SPENCER, OHIO.

Letters Patent No. 59,980, dated November 27, 1866.

SPECIFICATION.

TO ALL WHOM IT MAY CONCERN:

Be it known that I, S. F. DIMOCK, of Spencer, in the county of Medina, and State of Ohio, have invented certain new and useful improvements in Rat and Mouse Traps; and I do hereby declare that the following is a full and complete description of the construction and operation of the same, reference being had to the accompanying drawings, making a part of this specification, in which—

Figure 1:
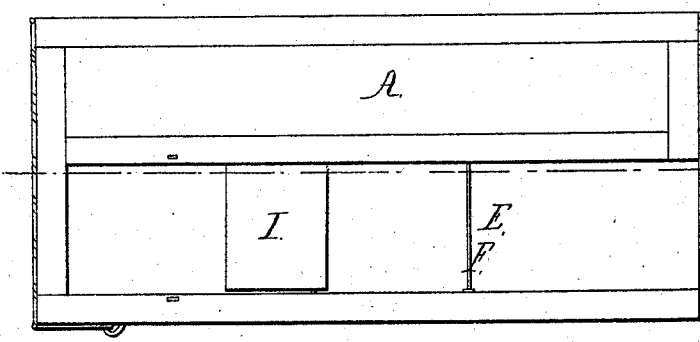
Figure 2:
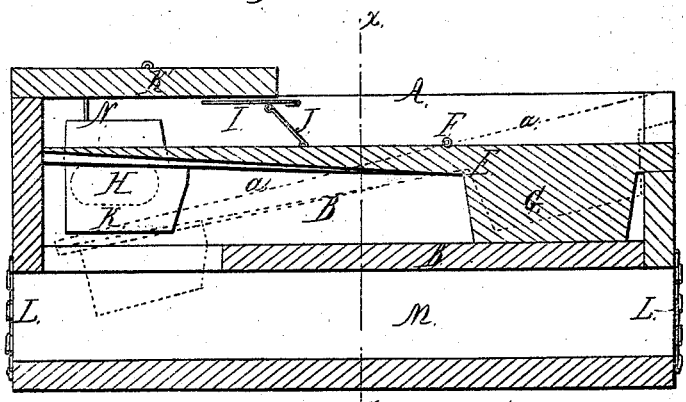
Figure 3:
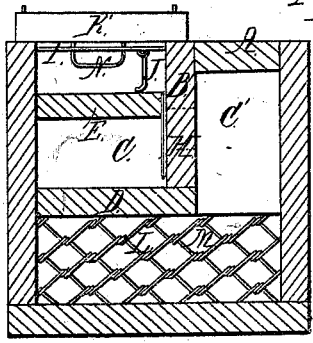

Figure 1 is a top view of the trap.
Figure 2 is a longitudinal section in the direction of the line $x\ x$, fig. 1.
Figure 3 is a transverse section in the direction of the line $x'\ x'$, in fig. 2.

This trap consists of an oblong square box, A, fig. 1, and is divided longitudinally to about half its depth by the partition B, forming thus two sections, C, C', fig. 3; the section C is enclosed from the lower part of the trap by the floor D, while the section C' is open to it. E is a pedal, fitted and pivoted at the point F, between the sides of section C, so that it will vibrate upward and downward. It will be seen that the pedal is not pivoted at the middle, but a little at one side of the centre, the long end of which, being counterbalanced by the weight G, this long end tapers or shingles out from the weight, so as to give more room between it and the bottom of the section in which it vibrates. H is a hole communicating with the section C'; I is a kind of trap-door, pivoted between the sides of section C, and is connected to the pedal by the link J; K is a piece of tin fastened to the side of the pedal, to which reference will be made hereafter; K' is a cover, which may be removed to bait the trap; this cover is not shown in fig. 1; L are wire gates or doors closing the chamber or room, M, below the sections C C'.

The operation of the trap is as follows: The bait is fastened to the loop N, figs. 2 and 3; the animal makes its way along towards it, upon the pedal above described, and under the door I, which at this time is raised, as shown in the drawing; the weight of the animal on passing the door causes the pedal to drop in the direction indicated by the dotted lines, $a$, fig. 2; at the same time drawing down the door immediately behind it, and thereby cutting off its retreat. The hole, H, now being open, the creature finds its way through that into the room M; the pedal, relieved of its weight, returns to its horizontal position by means of the counterbalance referred to, and draws up with it the tin door, K, which in this position of the pedal covers the hole, and the trap is now ready for the capture of the next animal. By this, it will be seen that the trap is self-setting, and will continue to set itself so long as the rats or mice can be induced into the trap, without the aid of springs or machinery of any kind for that purpose. The animals are taken from the trap through the door or gates, L, one being on each end for that purpose.

What I claim as my improvement, and desire to secure by Letters Patent, is—

The box A, door I, link J, and tin door K, as arranged in combination with the pedal E, in the manner and for the purpose as substantially set forth.

S. F. DIMOCK.

Witnesses:
J. H. BURRIDGE,
E. E. WAITE.